(12) United States Patent
Servilio et al.

(10) Patent No.: US 6,169,889 B1
(45) Date of Patent: Jan. 2, 2001

(54) METHOD AND ELECTRONIC DEVICE USING RANDOM PULSE CHARACTERISTICS IN DIGITAL SIGNALS

(75) Inventors: Mark L. Servilio, Boynton Beach; Michael J. DeLuca; Edgar Herbert Callaway, Jr., both of Boca Raton, all of FL (US)

(73) Assignee: Motorola, Schaumburg, IL (US)

( * ) Notice: Under 35 U.S.C. 154(b), the term of this patent shall be extended for 0 days.

(21) Appl. No.: 08/905,629

(22) Filed: Aug. 4, 1997

(51) Int. Cl.⁷ ........................................ H04B 1/00
(52) U.S. Cl. ............................. 455/296; 455/310
(58) Field of Search ...................... 455/63, 296, 310, 455/311, 312; 375/292

(56) References Cited

U.S. PATENT DOCUMENTS

| | | |
|---|---|---|
| 4,879,758 | 11/1989 | DeLuca . |
| 5,416,434 * | 5/1995 | Koostra et al. .................... 327/113 |
| 5,471,663 | 11/1995 | Davis . |
| 5,488,627 | 1/1996 | Hardin et al. . |
| 5,506,545 * | 4/1996 | Andrea .................................. 331/78 |
| 5,631,920 | 5/1997 | Hardin . |
| 5,659,587 * | 8/1997 | Knierim .............................. 375/376 |
| 5,867,524 | 2/1999 | Booth et al. . |
| 5,872,807 | 2/1999 | Booth et al. . |

OTHER PUBLICATIONS

IEEE International Symposium on Electromagnetic Compatibility, 1997, Keith B. Hardin et al., "Design Considerations of Phase–Locked Loop Systems for Spread Spectrum Clock Generation Compatibility," pp. 302–307.

*Using Spread Spectrum in ICS Products*, Integrated Circuit Systems, San Jose, California, Application Note, date unknown, 9 pages.

Imad Kobeissi, *Noise Reduction Techniques for Microcontroller–Based System*, Motorola Semiconductor Application Note, Motorola, Inc., 1997.

* cited by examiner

Primary Examiner—Reinhard J. Eisenzopf
Assistant Examiner—Makoto Aoki
(74) Attorney, Agent, or Firm—James A. Lamb

(57) ABSTRACT

An electronic device has reduced radio frequency interference (RFI) emissions. The electronic device includes a signal generator that is coupled to a reference clock signal and a first digital circuit. The signal generator generates a random signal derived from the reference clock signal. The first digital circuit is coupled to the signal generator. The random signal governs pulse characteristics of the first digital circuit.

9 Claims, 13 Drawing Sheets

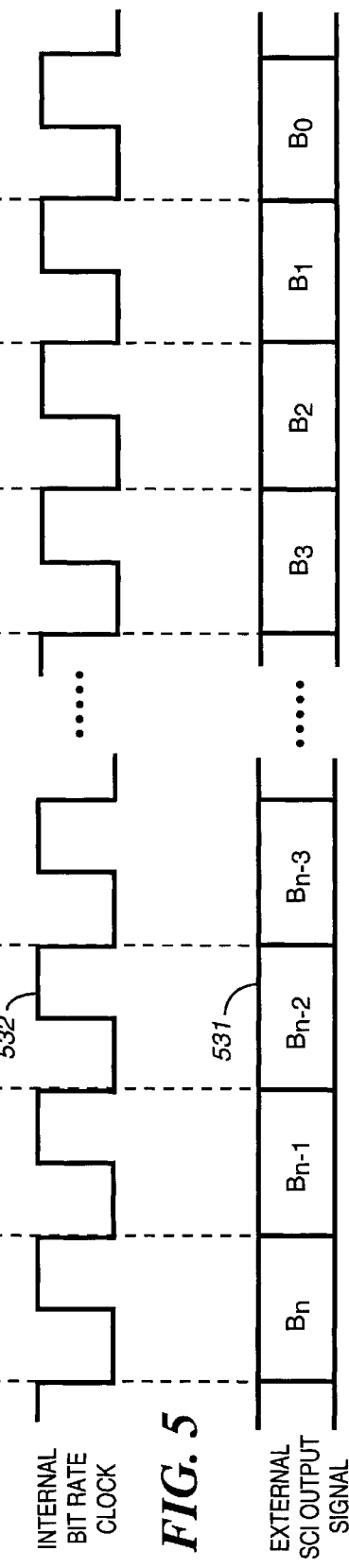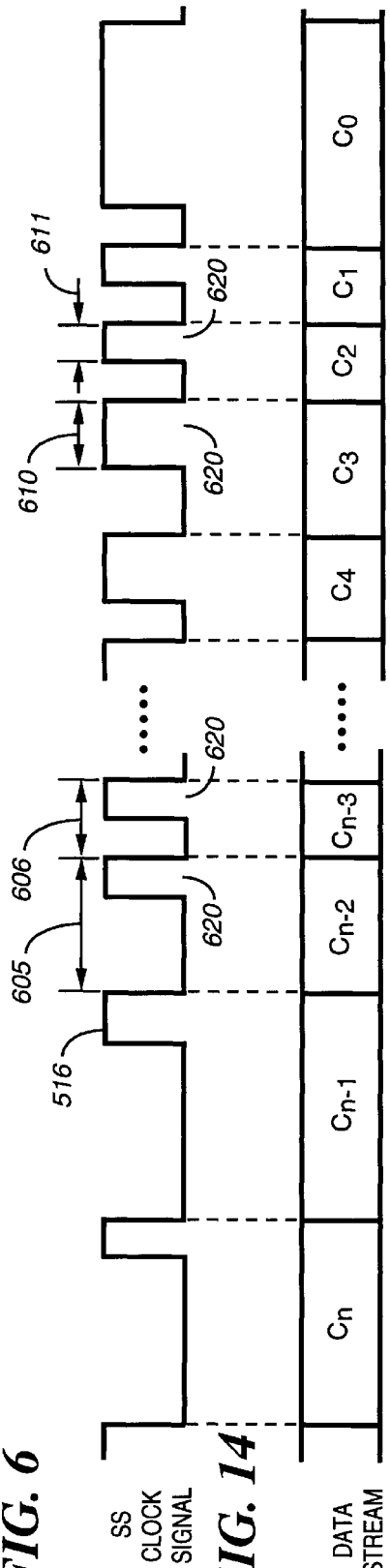

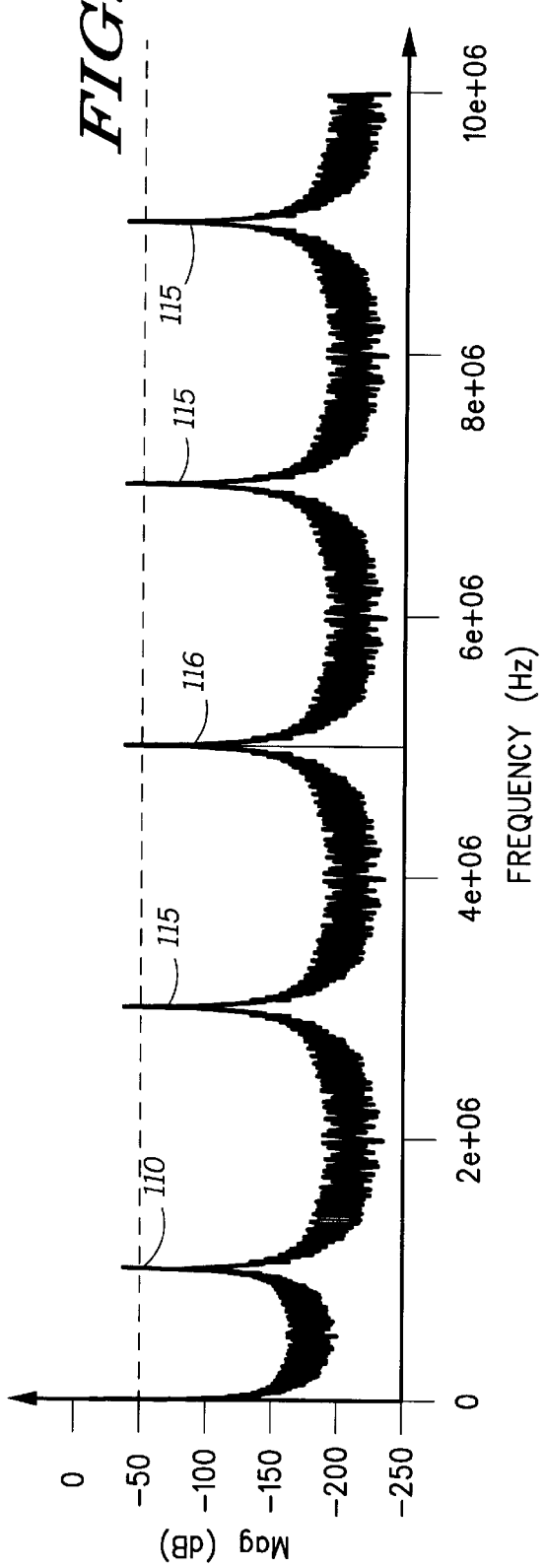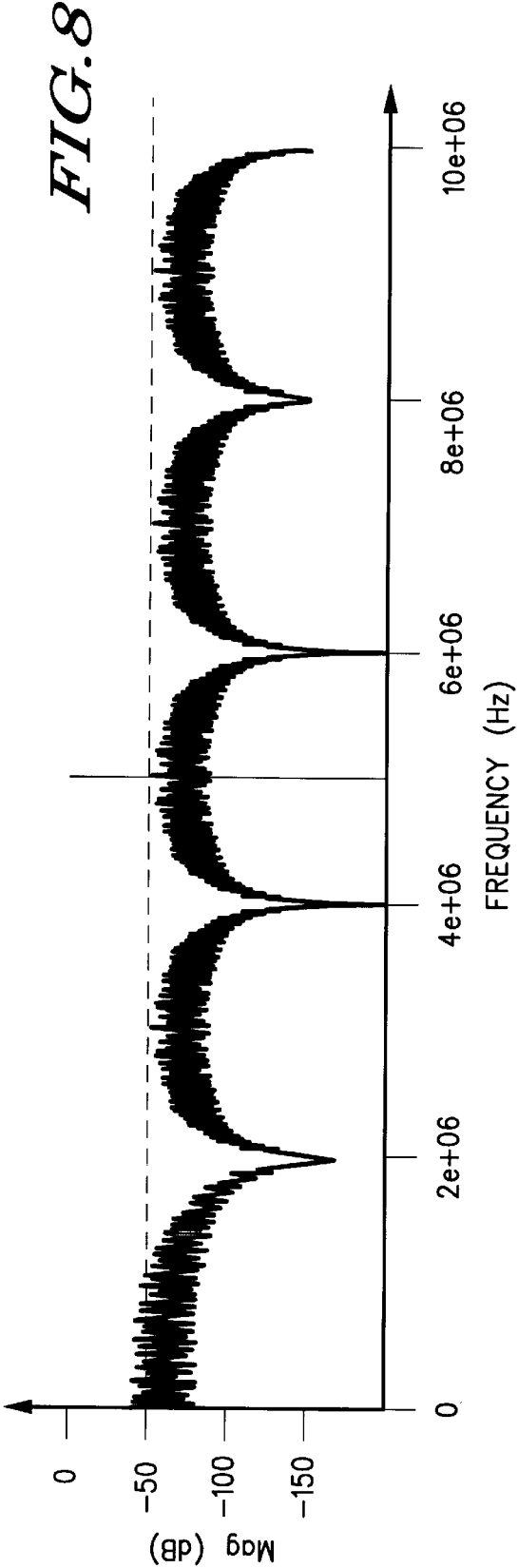

METHOD AND ELECTRONIC DEVICE USING RANDOM PULSE CHARACTERISTICS IN DIGITAL SIGNALS

RELATED APPLICATIONS

Application Ser. No. 08/760016, filed Dec. 4, 1996 by Servilio, entitled "ELECTRONIC DEVICE FOR GENERATING A SPREAD SPECTRUM CLOCK SIGNAL FOR USE IN COMMUNICATIONS BETWEEN DEVICE COMPONENTS"

FIELD OF THE INVENTION

This invention relates in general to clock and data signals used in digital circuits of electronic devices, and more specifically to the pulse characteristics of clock and data signals used in the digital circuits.

BACKGROUND OF THE INVENTION

Radio communication devices, such as portable messaging units, typically receive radio signals and decode messages included in the signals. The messages are then processed by circuits, such as decoders, processors, and memory circuits. Within radio communication devices and other electronic devices, circuits can be coupled by serial or parallel interfaces, each of which includes one or more digital lines. Each data line couples a digital signal made up of pulses that are clocked by a clock signal. The clock signal is derived from a reference signal generated by an oscillator. The reference signal is typically divided down into other, slower signals to clock some of the serial or parallel interfaces which operate at speeds slower than the reference signal; for example, a serial communications interface.

When a radio signal is received by a radio communication device which includes digital information, informational portions of the radio frequency spectrum exist within the receiver at a carrier frequency, and can exist at other frequencies, such as an intermediate frequency (IF). Because the serial and parallel interfaces have commonly been driven by clock signals which are periodic square wave signals, high energy harmonics characterized as radio frequency interference (RFI) have typically been generated by these signals. When these harmonics appear in an informational part of the frequency spectrum, they can cause interference problems, resulting in missed signals. Interference is commonly dealt with by radio frequency shielding or attempting to select a frequency of the master device to generate the reference clock signal such that the reference clock signal and other clock signals derived from it have harmonics that minimally interfere with the informational portions of the radio frequency spectrum. However, this method becomes very complex in a radio communication device having multiple clock signals that potentially interfere with the radio circuitry.

Thus, what is needed is a way to provide digital signals that further minimize RFI emissions in an electronic device, while maintaining average clock frequencies that are as high as possible.

BRIEF DESCRIPTION OF THE DRAWINGS

FIG. 2 is a timing diagram that illustrates a reference clock used in the selective call radio, in accordance with the preferred embodiment of the present invention.

FIG. 5 is timing diagram which illustrates a stable, periodic, accurate standard internal bit rate clock generated by a serial communication interface that is a portion of the selective call radio, in accordance with the preferred embodiment of the present invention.

FIG. 6 illustrates a serial data signal generated in the selective call radio, in accordance with the preferred embodiment of the present invention.

FIG. 7 is a frequency spectrum diagram that illustrates a narrow spectrum of a clock signal generated by the microprocessor when a radio receiver of the selective call radio is deactivated, in accordance with the preferred embodiment of the present invention.

FIG. 8 is a frequency spectrum diagram that illustrates a narrow spectrum of the clock signal whose spectrum is illustrated in FIG. 7, when the radio receiver of the selective call radio is activated, in accordance with the preferred embodiment of the present invention.

FIG. 14 is a timing diagram which illustrates a spread spectrum clock signal generated in the selective call radio, in accordance with the preferred embodiment of the present invention.

FIG. 15 is a timing diagram which illustrates a serial data signal clocked by the spread spectrum clock signal, in accordance with the preferred embodiment of the present invention.

DESCRIPTION OF A PREFERRED EMBODIMENT

Figure 1:
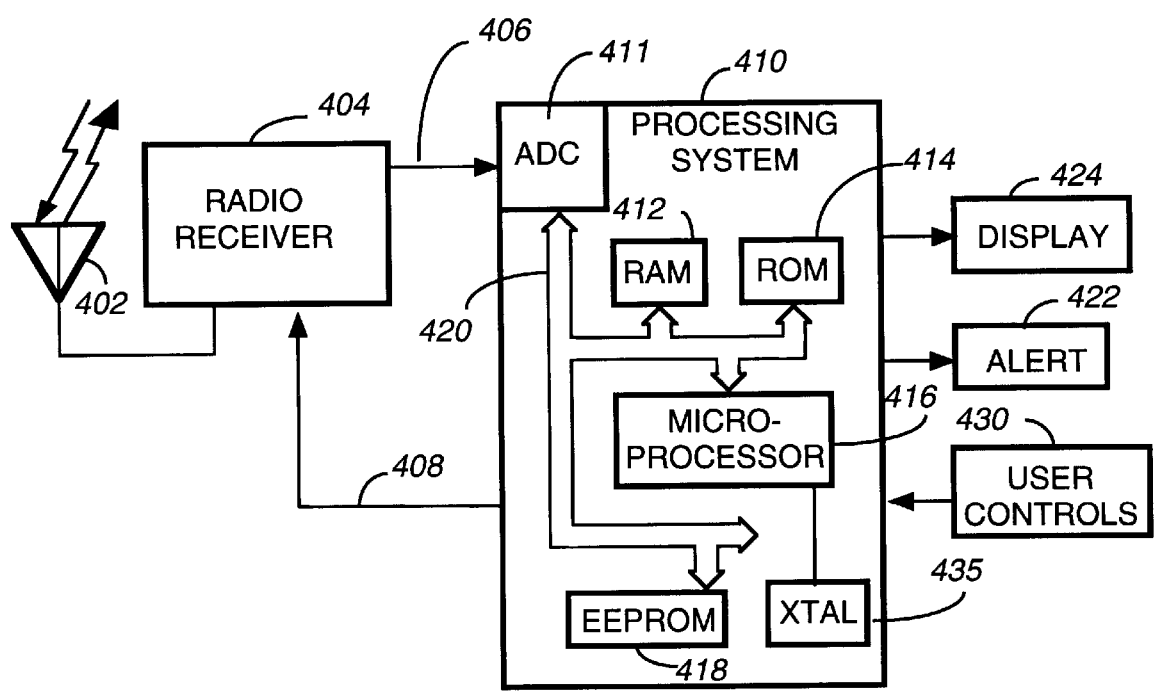
FIG. 1 is an electronic block diagram of a selective call radio, in accordance with the preferred embodiment of the present invention.

Referring to FIG. 1, an electronic block diagram of a selective call radio 400 is shown, in accordance with the preferred embodiment of the present invention. The selective call radio 400 comprises an antenna 402, a radio receiver 404, a processing system 410, a display 424, an alert device 422, and user controls 430. The antenna 402 intercepts and couples a radio signal to the radio receiver 404. The radio signal includes a desired radio signal having a bandwidth, and noise. The radio receiver 404 filters portions of the noise which are outside the signal bandwidth, leaving a remaining signal which comprises the desired radio signal and in-band noise. The remaining signal is amplified, converted, and demodulated in a conventional manner, generating a received signal 406. The received signal 406 is coupled to the processing system 410 that comprises a microprocessor 416, a random access memory (RAM) 412, a read only memory (ROM) 414, and an electrically erasable, programmable read only memory (EEPROM) 418, which are all intercoupled by an external bus 420 which comprises a plurality of bus signals carried on a respective plurality of external bus lines; and a crystal (XTAL) 435. The processing system 410 is coupled to the radio receiver 404 by a power control signal 408 and is further coupled to the audio amplifier 426, the display 424, the alert device 422, and the user controls 430. The crystal 435 is coupled to the microprocessor 416 for generating a reference clock signal 506, illustrated in FIG. 2.

The received signal 406 is digitally processed by the microprocessor 416 under the control of instructions stored in the EEPROM 418 and ROM 414. When an address in the received signal 406 is decoded by the microprocessor 416 that matches an identification of the selective call radio 400 that is stored in the EEPROM 418, the received signal 406 is further processed by the microprocessor 416. When the received signal 406 is determined to be sufficiently error free, the microprocessor 416 generates an alert at the alert device 422 to inform the user that a message has been received. When the received signal 406 includes alphanumeric information, the alphanumeric information is displayed on the display 424, as determined by user settings. User settings are entered by means of the user controls 430. The processing system 410 deactivates the radio receiver 404 via the power control signal 408 at predetermined times when no signals are expected to be received by the radio receiver 404, and activates the radio receiver 404 when signals are expected to be received.

Figure 3:
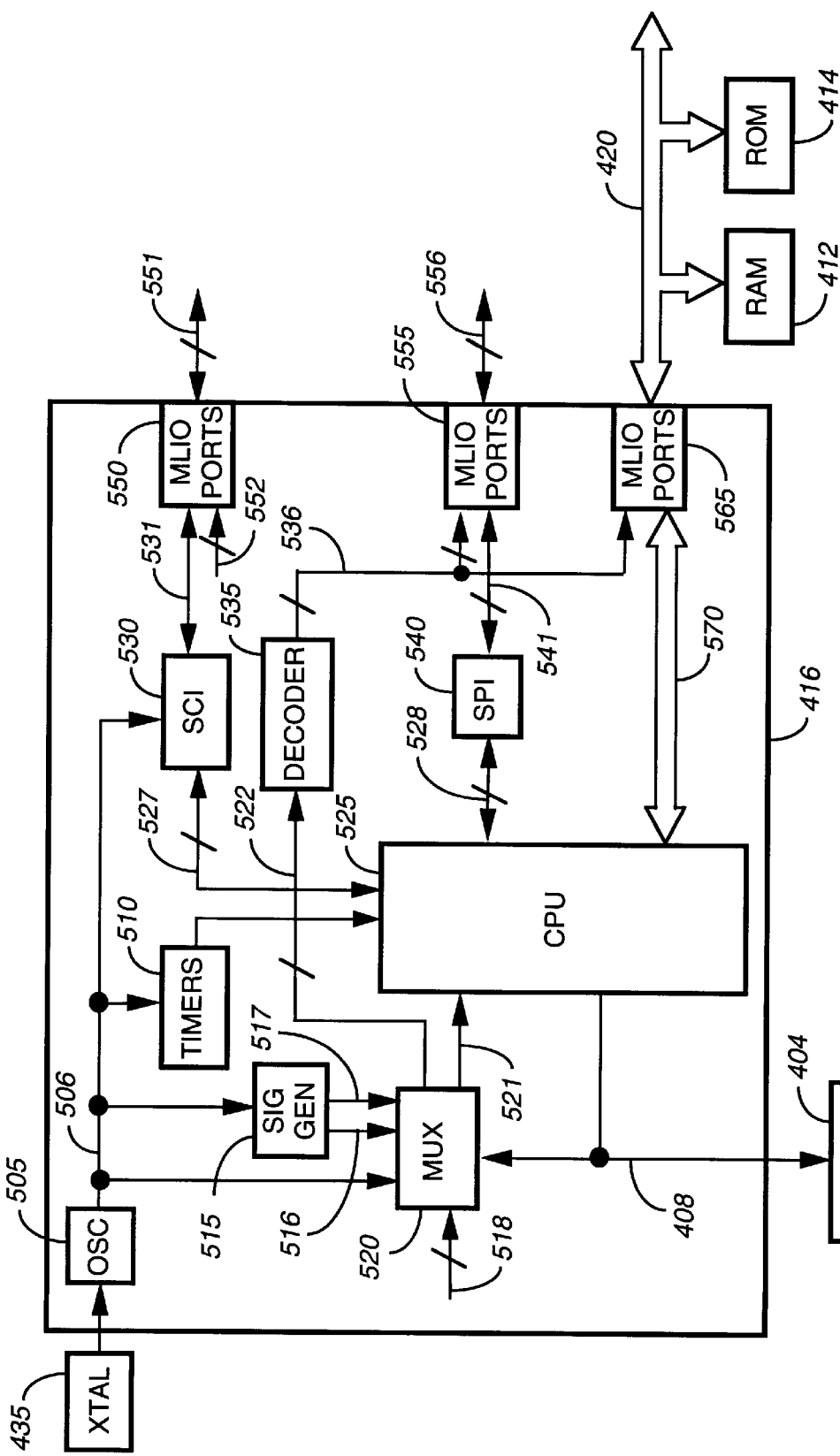
FIG. 3 is an electronic block diagram of a microprocessor and other portions of the selective call radio, in accordance with the preferred embodiment of the present invention.

Referring to FIG. 3, an electronic block diagram of the microprocessor 416 and other portions of the selective call radio 400 is shown, in accordance with the preferred embodiment of the present invention. The microprocessor 416 is an integrated circuit that comprises an oscillator (OSC) 505, timers 510, a signal generator (SIG GEN) 515, a multiplexer (MUX) 520, a central processing unit (CPU) 525, a serial communication interface (SCI) 530, a decoder (DECODER) 535, a serial peripheral interface (SPI) 540, and multilevel input-output ports (MLIO) 550, 555, 565. The oscillator 505, alternatively called the reference clock 505, is coupled to the crystal 435 to generate an accurate and stable reference clock signal 506 (FIG. 2) that is coupled to the multiplexer 520, the signal generator 515, the timers 510, and the SCI 530. The reference clock signal 506 (FIG. 2) is a high frequency square wave signal at 10 MHz. The oscillator 505, SCI 530, SPI 540 are conventional digital logic circuits.

The timers 510 are conventional timers which generate interrupts to the CPU 525 at intervals set by the CPU 525 that are accurately based upon the reference clock signal 506. The timers 510 include a real time clock that continuously maintains an internal clock synchronized to a synchronous protocol used for generating the radio signal intercepted by the antenna 402.

In some prior art radio receivers, communication between device components is discontinued during attempted reception of a radio signal so that the receiver is not desensed. However, this method results in delayed processing of information. Furthermore, in more complex radio receivers having greater numbers of device components, the device components may be required to communicate when the radio receiver 404 is activated, rendering the method of discontinuing component communications impractical.

In accordance with the preferred embodiment of the present invention, the signal generator 515 processes the reference clock signal 506 to generate therefrom a spread spectrum (SS) clock signal 516, in which the periods and durations of the pulses are pseudorandom or random, rather than fixed, and a slew rate control signal 517, which is a set of parallel binary signal lines that represent a binary number, and that are pseudorandomly or randomly varied as a set, and clocked by the SS clock signal 516. For conciseness, the terms "random" and "randomly" as used hereinafter are meant to imply, respectively, "essentially random or pseudorandom" and "essentially randomly or pseudorandomly." The SS clock signal 516 and slew rate control signal 517 are coupled to the multiplexer 520. When the power control signal 408 activates the radio receiver 404, it controls the multiplexer 520 to couple the SS clock signal 516 and slew rate control signal 517, respectively, to the CPU 525 via a CPU clock signal 521 and to the decoder 535 via decoder input lines 522, which is a parallel signal line. Also coupled to the multiplexer 520 is a predetermined binary number 518, which is a set of parallel binary signal lines that are fixed at predetermined binary values. When the power control signal 408 deactivates the radio receiver 404, it controls the multiplexer 520 to couple the reference clock signal 506 and the predetermined binary number 518, respectively, to the CPU 525 via CPU clock signal 521 and to the decoder 535 via the decoder input lines 522. The decoder 535 decodes the decoder input lines 522 from a binary number to a multilevel output (MLO) drive signal 536 that is a one of N line selection signal.

Figure 4:
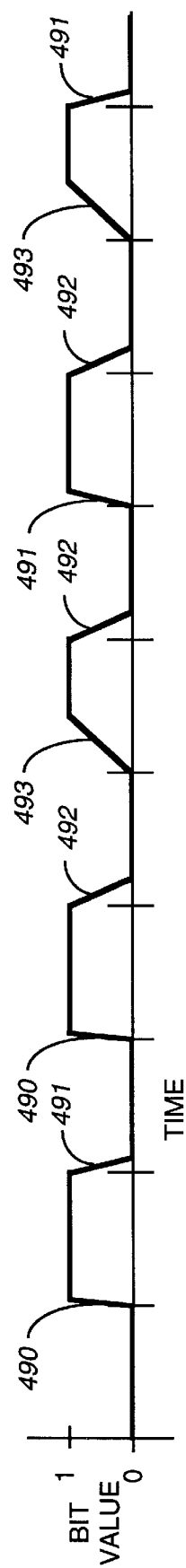
FIG. 4 is a timing diagram which illustrates a serial data signal driven by a multilevel output pad in the selective call radio, in accordance with the preferred embodiment of the present invention.

The MLO drive signal 536 is coupled to the MLIO ports 555, 565 for selecting one of a set of N output drive levels of the MLIO ports 555, 565. The SCI drive signal 552 comprises a fixed set of predetermined binary signals coupled to the MLIO port 550. The MLIO ports 550, 555, 565 each comprise one or more multilevel output (MLO) driver pads that drive, respectively, external outputs of an external SCI output signal 551, an external SPI output signal 556, and the external bus lines of the external bus 420 at one of the set of N output drive levels. N is 4 in accordance with the preferred embodiment of the present invention, but N can have other integral values in other embodiments. An example of a series of the randomly varied values of the numbers represented by the slew rate control signal 517, that are determined for each period of a clock derived from the SS clock signal 516 when the radio receiver 404 is activated, is: 0, 1, 0, 2, 3, 2, 1, 2, 3, 1, 1, 1, 0, 2, 3 . . . . Each one of the N output drive levels causes the MLIO ports 555, 565 to generate to a different slew rate (the inverse of the rise and fall time) of the rising and falling edges of the pulses in the signals coupled to the MLIO ports 555, 565. FIG. 4 is a timing diagram which illustrates a serial data signal driven by the MLIO port 565 during the beginning portion of the series given above (0, 1, 0, 2, 3, 2, 1, 2, 3, 1) when a data signal being driven by the MLIO port 550 is a data signal starting with a series of bits 0, 1, 0, 1, 0, 1, 0, 1, 0, 1, and wherein the four slew rates 490, 491, 492, 493 correspond, respectively, to the values 0, 1, 2, 3 in the set of four binary values, and have values of approximately 1/10, 1/20, 1/50, and 1/100 nanosecond$^{-1}$. For simplicity of the example being illustrated, the pulses of the clock that clocks the signal are pulses having non-random periods and durations. It will be appreciated that, in accordance with the preferred embodiment of the present invention, the pulses of the clock that clocks the signal are actually pulses that have random periods and durations when the slew rates of signals driven by the MLIO ports 555, 565 are random. It will be further appreciated that the actual waveform would have smoother transitions (rounder edges) than those illustrated in FIG. 4. Because the slew rate control signal 517 controls the selection of the output drive levels of the MLIO ports 555, 565, the drive levels are varied randomly. As a result, the external SCI output signal 551, the external SPI output signal 556, and external bus lines of the external bus 420 have pulses the slew rates of which vary randomly among the four output drive levels.

The SCI 530 is designed to communicate information which can be coupled via a conventional modem using a standard interface such as EIA-RS 232, at such standard bit rates as 9600, 19.2, 28.8, and 56 kilobits per second (kbps). In accordance with the preferred embodiment of the present invention, SCI 530 is used to communicate to a piece of test equipment during testing of the selective call radio 400. The SCI 530 is coupled to the CPU 525 by parallel data lines 527 for transfer of data information in parallel from the CPU 525 to the SCI 530. While the SCI 530 is communicating to the piece of test equipment, the SCI 530 divides the reference clock signal 506 in a conventional manner to produce a stable, periodic, accurate standard internal bit rate clock 532 at 56 kbps, as illustrated in the timing diagram shown in FIG. 5. Using the internal bit rate clock 532, the SCI 530 produces from the parallel data a serial data signal 531 that is coupled to the MLIO port 550. FIG. 6 illustrates the serial data signal 531, in which bits are transferred on falling edges of the internal bit rate clock 532. The MLIO port 550 amplifies the serial data signal 531, producing the external SCI output signal 551 with a fixed slew rate determined by the MLO drive signal 552. As a result, the external SCI output signal 551 has data pulses with uniform durations, periods, and slew rates whenever the power control signal 408 deactivates the radio receiver 404.

The SPI 540 is designed to communicate information from the CPU 525 to other processors. In accordance with the preferred embodiment of the present invention, the SPI 540 is used to communicate with a controller that is a part of the display 424 (FIG. 1). The SPI 540 is coupled to the CPU 525 by parallel data lines 528 for transfer of SPI data information in parallel from the CPU 525 to the SPI 540. The CPU clock signal 521 is also included in the parallel data lines 528. The SPI divides the CPU clock signal 521 and uses the divided clock signal to generate a SPI predrive signal 541 that is coupled to MLIO port 555. The SPI predrive signal 541 is therefore generated having clock and data pulses that have random durations and periods whenever the power control signal 408 activates the radio receiver 404. The SPI predrive signal 541 is generated having a uniform clock with pulses having uniform durations, periods, and slew rates, and data pulses based on the uniform clock, whenever the power control signal 408 deactivates the radio receiver 404. The MLIO port 555 amplifies the SPI predrive signal 541, producing the external SPI output signal 556 with slew rates determined by the MLO drive signal 536, with the result that the external SPI output signal 556 has clock and data pulses with random durations, periods, and slew rates, whenever the power control signal 408 activates the radio receiver 404, but has a uniform clock with pulses having uniform durations, periods, and slew rates, and data pulses based on the uniform clock, whenever the power control signal 408 deactivates the radio receiver 404.

The CPU 525 communicates with the RAM 412 and other external bussed devices using the plurality of external bus signals on the plurality of bus lines of the external bus 420. The plurality of external bus signals are generated from signals on an internal data bus 570 that is coupled to the MLIO port 565. The signals on the internal data bus 570 are clocked using a clock derived by dividing the CPU clock signal 521. The MLIO port 565 amplifies the signals on the internal data bus 570, producing the external bus signals with slew rates determined by the MLO drive signal 536, with the result that the external bus 420 output signals have clock and data pulses with random durations, periods, and slew rates, whenever the power control signal 408 activates the radio receiver 404, but has a uniform clock with pulses having uniform durations, periods, and slew rates, and data pulses based on the uniform clock, whenever the power control signal 408 deactivates the radio receiver 404.

The generation, amplification, and coupling of the external SCI output signal 551, the external SPI output signal 556, and signals on the lines of the external bus 420 result in the generation of radio frequency interference (RFI) over a wide range of frequencies. The RFI that is generated is described in more detail below with reference to FIGS. 7 and 8.

Referring to FIG. 7, a frequency spectrum diagram is shown that illustrates a narrow spectrum of a clock signal generated by the microprocessor 416 when the radio receiver 404 is deactivated, in accordance with the preferred embodiment of the present invention. The clock signal is a 1 MHz periodic signal having a 50% duty cycle, that is derived from the reference clock 505. The clock signal is one of a plurality of bus signals in the internal data bus 570 generated by the microprocessor 416, by which the external bus signals of the external bus 420 are clocked. RFI generated by the clock signal has relative energies in the frequency range from 0 Hertz to 10 MHz as shown in FIG. 7. The 1 MHz clock signal has peaks 110, 115, 116 at its first, third, fifth, seventh, etc. harmonics. The relative energy of the peak 116 at the fifth harmonic (5 MHz), is approximately −39 dB. The spectrum includes the peaks 110, 115, 116 shown in FIG. 7 as well as numerous other peaks at the odd harmonics of the clock signal frequency, which are repeated up to many hundreds of multiples of the clock signal rate. While this spectrum is for an ideal periodic half duty cycle square wave, it is representative of the RFI emitted by the signals that are clocked by the illustrated clock signal as well as others. For example, the external SPI output signal 556 of the SPI 540, when clocked with the 1 MHz periodic clock signal whose spectrum is illustrated in FIG. 7, will emit RFI having strong spectral peaks at odd 1 MHz intervals. When the radio receiver 404, is activated, the strong peaks of the RFI generated by signals clocked by this clock signal would cause interference with the radio receiver 404. However, in accordance with the preferred embodiment of the present invention, when the radio receiver 404 is activated, the CPU clock input signal is switched by the multiplexer 520 to become the SS clock signal 516, which reduces the RFI as explained below.

Referring to FIG. 8, a frequency spectrum diagram is shown that illustrates a narrow spectrum of the clock signal whose spectrum is illustrated in FIG. 7, when the radio receiver 404 is activated, in accordance with the preferred embodiment of the present invention. The clock signal shown in FIG. 8 is derived from the SS clock signal 516 when the radio receiver 404 is activated, and is therefore also a spread spectrum clock signal. The average period of the clock signal producing the spectrum shown in FIG. 8 is 1 microsecond, so the "average frequency" of the signal may be said to be 1 MHz. It will be appreciated that the spectrum of the clock signal based on the SS clock signal 516 has nulls at even harmonics of the clock signal frequency, and has maximum average values of approximately −50 dB, which are substantially less than the value of the peaks 110, 115, 116 of the clock signal in FIG. 7. While the spectrum shown in FIG. 8 is representative of the RFI emitted by the clock signal when the radio receiver 404 is activated, it is also representative of the spectrum of data signals that are clocked by the clock signal when the radio receiver 404 is activated. For example, the external output signal 556 of the SPI 540, when clocked with the clock signal when the radio receiver 404 is activated, has significantly weaker peaks than the RFI generated by the same external output signal 556 when the radio receiver 404 is deactivated and the external output signal 556 is being clocked by a uniform clock. Clock signals derived from the SS clock signal 516 are used to clock the internal data bus 570 and SPI 540, thereby reducing the strength of the peaks generated by internal data bus 570, the external bus 420, the signals coupled to the SPI 540, and the external SPI output signal 556 and thereby reducing desensitization (reduced signaling sensitivity) of the radio receiver 404.

Figure 9:
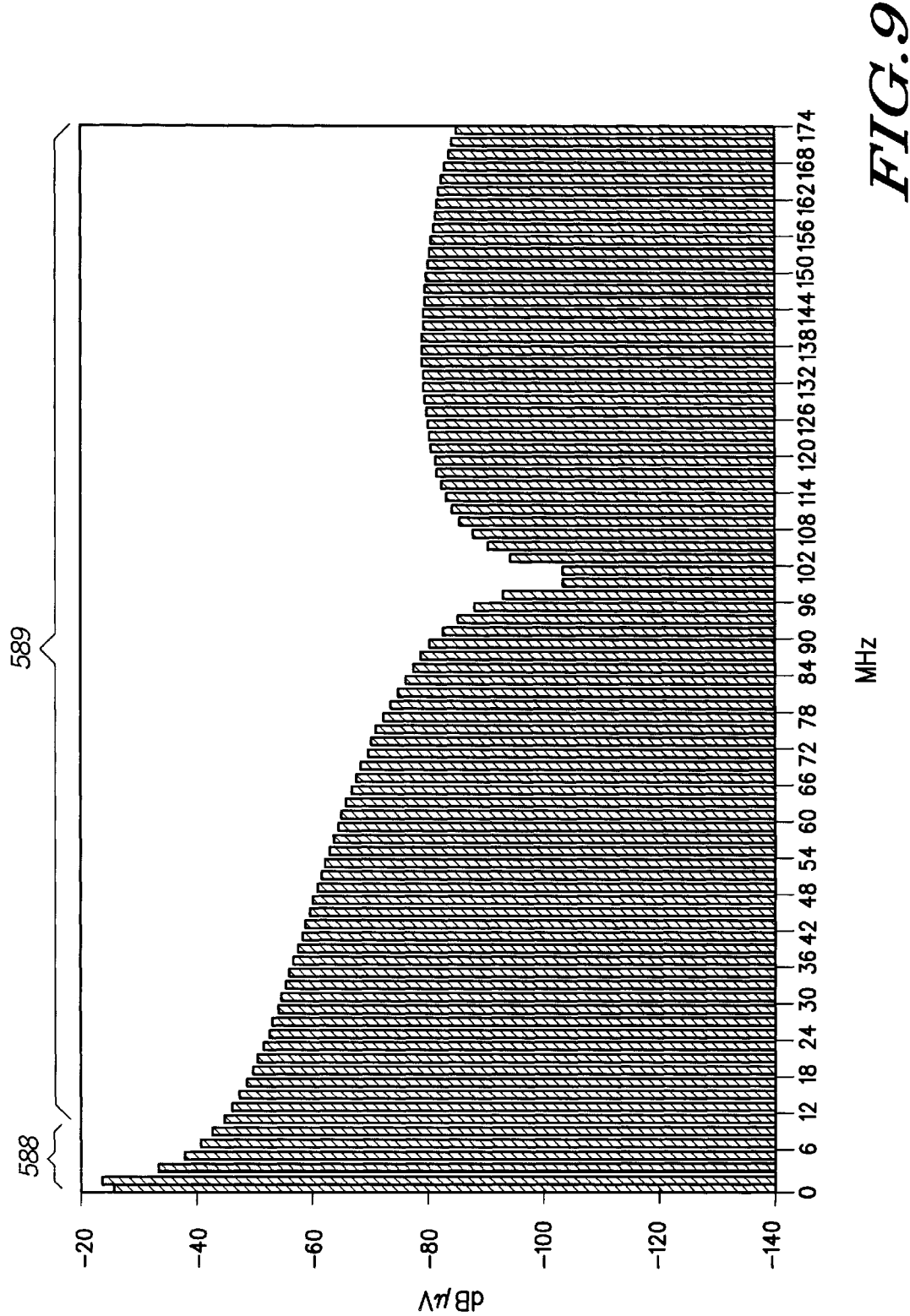
FIG. 9 is a frequency spectrum diagram that illustrates a wide spectrum of a clock signal of an external bus of the microprocessor, in accordance with the preferred embodiment of the present invention.

Referring to FIG. 9, a frequency spectrum diagram is shown that illustrates a wide spectrum of a clock signal of the external bus 420, in accordance with the preferred embodiment of the present invention. The clock signal whose spectrum is illustrated in FIG. 9 is generated by an MLO pad 600 (described more fully with reference to FIG. 19) of the MLIO port 565 from the clock signal whose spectrum is illustrated in FIG. 7 when the radio receiver 404 is deactivated. The MLO pad 600 is being driven by an MLO drive signal 536 that is held at a value such that the slew rate is the maximum slew rate (the slew rate having the fastest rise and fall time, approximately 10 nanoseconds) of the slew rates selectable by the MLO drive signal 536. The spectrum illustrated in FIG. 9 shows a multiplicity of peaks 588, 589 that have an envelope that has first null at 100 MHz. Additional nulls occur at multiples of 100 MHz and a relative peak of the envelope occurs between each pair of nulls. The spectrum illustrated in FIG. 9 includes the peaks 588 which correspond to the peaks 110, 115, 116 shown in FIG. 7. When the radio receiver 404 is activated, the stronger peaks of the RFI generated by this external clock signal and the stronger peaks of RFI generated by data signals clocked at this same frequency with approximately 1/10 nanoseond$^{-1}$ (nsec$^{-1}$) slew rates, would combine to cause interference with the radio receiver 404. However, in accordance with the preferred embodiment of the present invention, when the radio receiver 404 is activated, the decoder input lines 522 are switched from fixed values to the values of the slew rate control signal 517, values that vary randomly, and that are clocked by the SS clock signal 516. The decoder 535 decodes random values of the decoder input lines into the MLO drive signal 536, which is coupled to all of the MLO pads 600 of the MLIO ports 555, 565. The MLO drive signal 536 controls the slew rate of the signals driven by the MLIO ports 555, 565 to have rise and fall times at one of the values of approximately 10, 20, 50 or 100 nsec.

Figure 10:
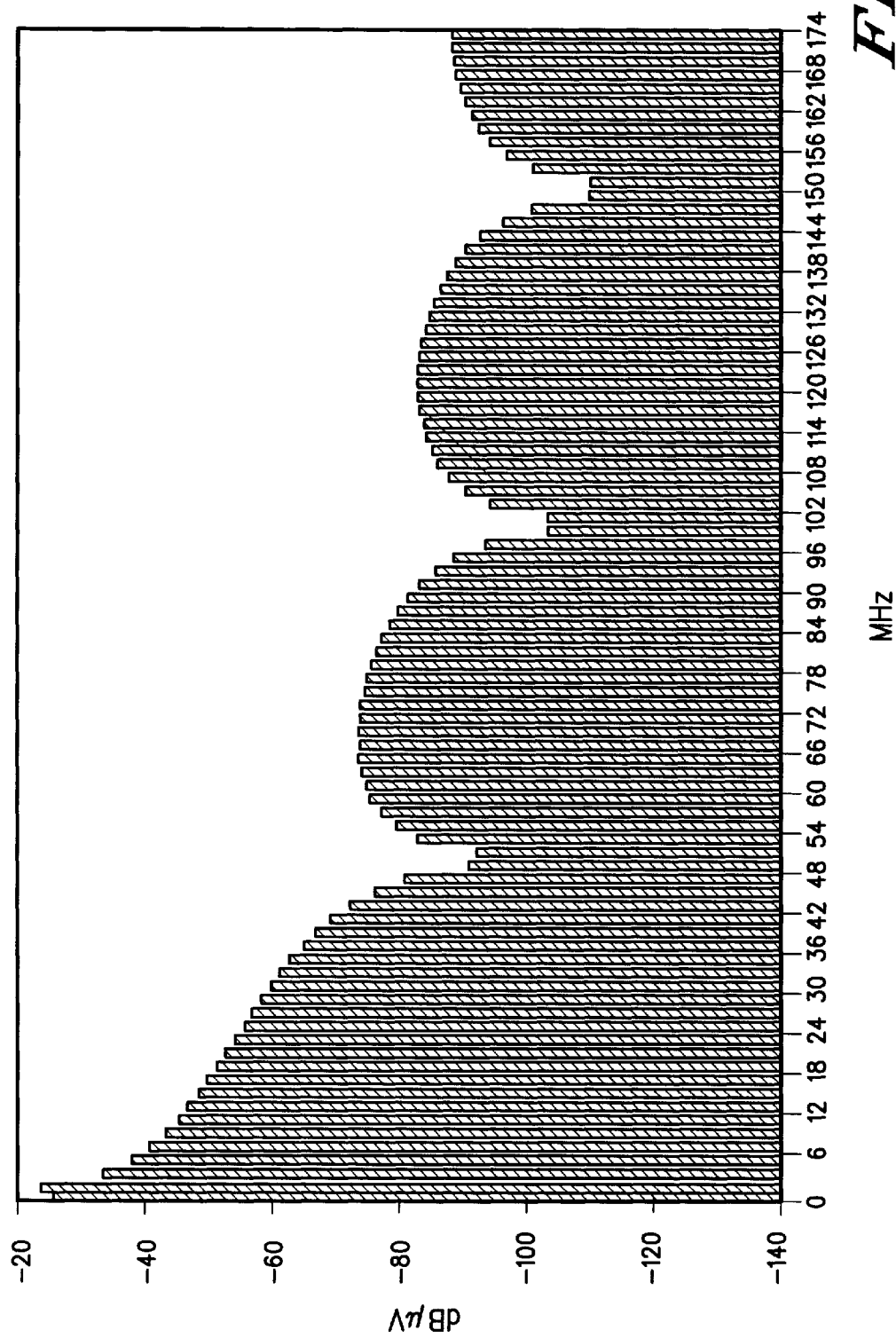
FIGS. 10–12 are three frequency spectrum diagrams that each illustrate a wide spectrum of a clock signal of the external bus for differing slew rates, in accordance with the preferred embodiment of the present invention.
Figure 11:
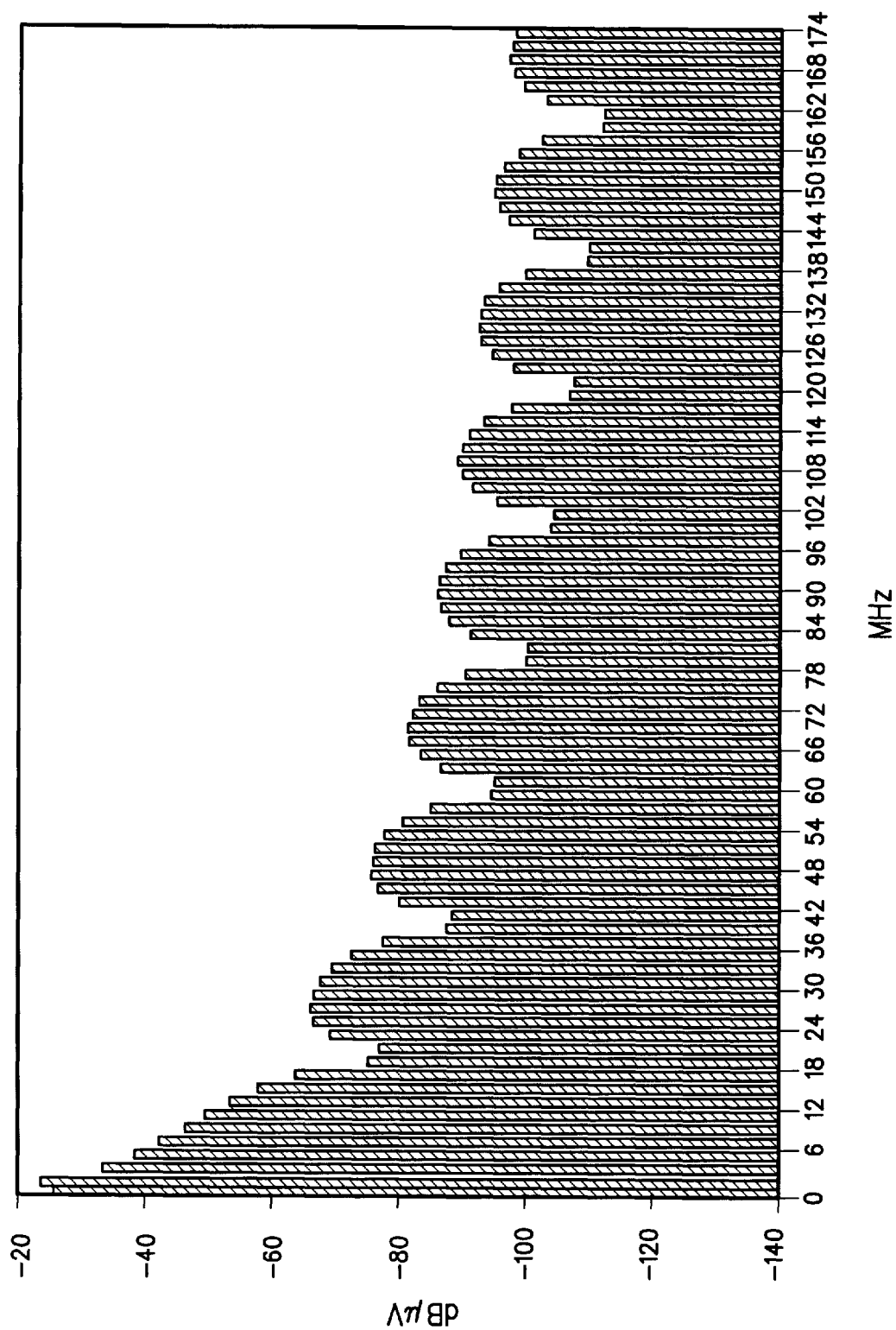
Figure 12:
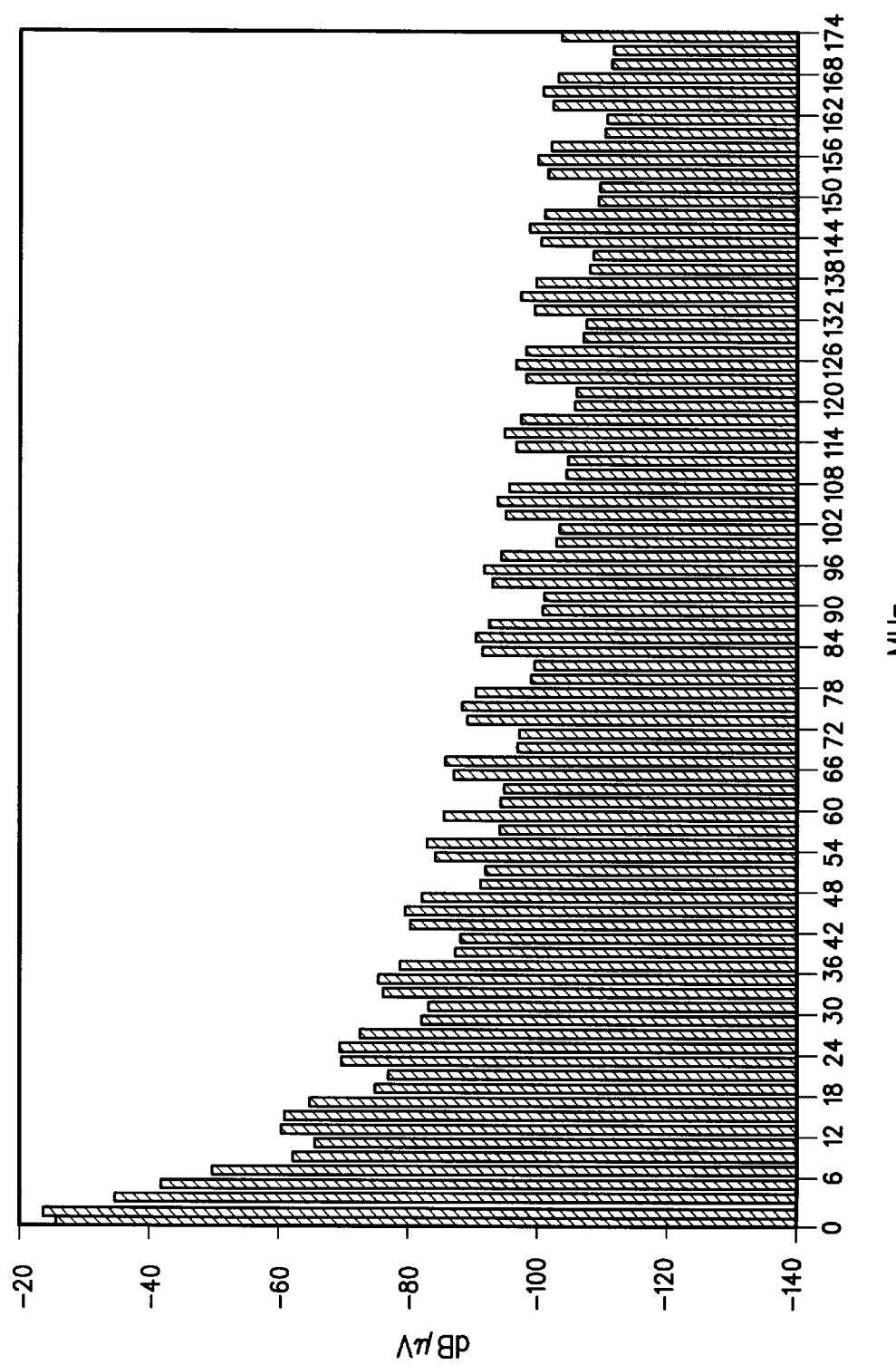

Referring to FIGS. 10–12, three frequency spectrum diagrams are shown that each illustrate a wide spectrum of a clock signal of the external bus 420 for differing slew rates, in accordance with the preferred embodiment of the present invention. The spectrums illustrate the spectrums in the case of periodic clock signals having a frequency of 1 MHz and slew rates of 1/20, 1/50, and 1/100 nsec$^{-1}$. It will be appreciated that any one of these spectrums would arise only if the MLO output drive signal were fixed so as to maintain a constant slew rate. It will be further appreciated that the spectrums generally have their envelope peaks at differing frequencies, and that as a result, when the MLO drive signal randomly varies the slew rate amongst the four slew rates, the result is that the envelope of the spectral peaks of the resulting spectrum are flattened out with respect to any one of the spectrums shown in FIGS. 9–12, thereby reducing the strength of the stronger peaks generated by the MLIO ports 555, 565, and thereby reducing desensitization (reduced signaling sensitivity) of the radio receiver 404. It will be further appreciated that a different number of slew rates could be used. More slew rates would provide further smoothing of the peaks at the expense of more complexity; fewer slew rates would limit the amount of smoothing.

It will be appreciated that the strong peaks of the spectrum of interfering signals generated by the microprocessor 416 are more optimally minimized by the combined use of the SS clock signal 516 to derive the signals being driven by the MLIO ports 555, 565 and the use of the randomly changing MLO drive signal 536 with the MLIO ports 555, 565 to vary the slew rates. When this combination is used, communications between device components, e.g., the microprocessor 416 and the display 424; the microprocessor 416 and the RAM 412, can occur while the radio receiver 404 is activated without interfering with reception of radio signals.

It will be further appreciated that in an alternative embodiment of the present invention, wherein the characteristics (period, duration, and slew rate) of the pulses being randomized are designed with values that are, within each characteristic, relatively prime with respect to any pair of the allowed values of the characteristic, the reduction of the strong peaks in the interfering signals generated by the microprocessor 416 are even further reduced. Relatively prime means that the ratio of any two values is reducible only to a ratio of prime integer values, which do not include the integer 1. For example, when the pulse durations of the SS clock signal 516 have one of four possible pulse durations, then durations having relative values of 200 nsec, 300 nsec, 500 nsec, and 700 nsec would be relatively prime, because their ratios are reducible only to a ratio of prime integers other than 1. Similarly for the pulse period and slew rate. For example, the four pulse periods, 1100 nsec, 1300 nsec, 1700 nsec, and 1900 nsec are relatively prime, as are a set of slew rates of 1/19, 1/41, 1/87, 1/151 nsec$^{-1}$.

Figure 13:
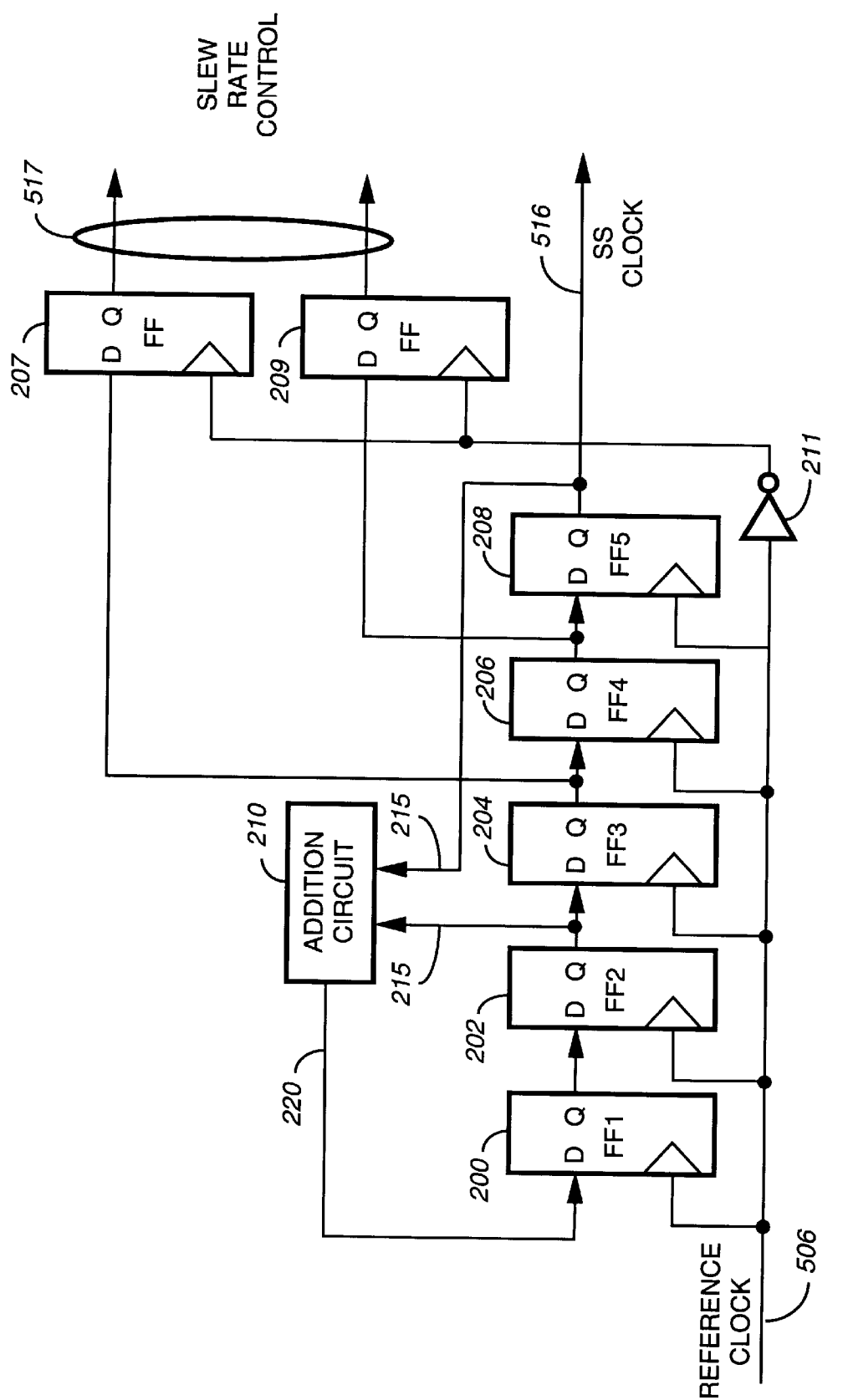
FIG. 13 is an electrical schematic of the signal generator used in the selective call radio, in accordance with the preferred embodiment of the present invention.

Referring to FIG. 13, an electrical schematic of the signal generator 515 is shown, in accordance with the preferred embodiment of the present invention. The signal generator 515 is implemented as a linear feedback shift register (LFSR) comprising a plurality of D-type flip flops (FFs) 200, 202, 204, 206, 208 and an addition circuit 210, and a slew rate controller comprising FF 207, 209. The FFs 200, 202, 204, 206, 208 have clock inputs coupled to the reference clock signal 506, and are latched on the falling edge of the reference clock signal 506. A last FF 208 has a Q output that provides the SS clock signal 516. The FFs 207, 209 have clock inputs coupled to the reference clock signal 506 through an inverter 211. Q outputs of FFs 200, 202, 204, 206 are coupled to respective D inputs of the FFs 202, 204, 206, 208. The Q outputs of FFs 204, 206 are coupled, respectively, to the D inputs of FFs 207, 209. The Q outputs of FFs 207, 209 form the slew rate control signal 517, which is clocked on the falling edge of SS clock signal 516. It will be appreciated that the slew rate control signal 517 and the SS clock signal 516 are all derived from the random signal generated at the output 220 of the addition circuit 210, and are all signals that vary pseudorandomly. It will be further appreciated that by generating the slew rate control signal 517 in this manner, there is a correlation between the values, n, represented by the slew rate control signal 517 and the SS clock signal 516: n is 0 during falling edges of pulses followed by a low state lasting two or more cycles of the reference clock signal 506; n is 1 during falling edges of pulses followed by a low state lasting one cycle of the reference clock signal 506; n is 2 during rising edges of pulses followed by a high state (pulse duration) lasting one cycle of the reference clock signal 506; n is 3 during rising edges of pulses followed by a high state lasting two or more cycles of the reference clock signal 506. In accordance with the preferred embodiment of the present invention, the decoder 535 decodes the decoder input lines 522 so as to provide a one of N line selection signal 536 that causes the MLIO ports 555, 565 to generate higher slew rates when the value of the decoder input lines is 1 or 2, and lower slew rates when the value of the decoder input lines is 0 or 4, thus generally correlating higher slew rates to shorter pulse durations and periods, and correlating lower slew rates to longer pulse durations and periods.

The addition circuit 210 is included for performing conventional modulo 2 addition. The addition circuit 210 has at least two inputs 215 that are coupled to Q outputs of selected FFs. The random signal generated at the output of the addition circuit 210 is coupled to the D input of a first FF 200. The addition circuit 210 can be implemented using different numbers of exclusive OR gates.

The number of FFs included in the LFSR, i.e., the number of register bits, depends upon the degree to which the frequency spectrum of the SS clock signal needs to be spread. In general, a greater number of FFs provides more pulse period, duration, and slew rate randomization and therefore more spreading of the spectrum and less interference with radio reception.

The specific circuitry included in the LFSR can be determined by running simulations to predict the strengths of the different harmonics associated with the SS clock signal 516 and slew rate control signal 517 generated by using different numbers of FFs. By way of example, simulations can be performed in a conventional manner using primitive polynomials to characterize the LFSR and thereby produce a maximally pseudorandom SS clock signal 516 and a maximally pseudorandom slew rate control signal 517. This use of primitive polynomials is well known to one of ordinary skill in the art and is described in several texts, such as "Built-In Test for VLSI: Pseudorandom Techniques" by Bardell et al., published by John Wiley & Sons, N.Y., 1987.

By way of example only, a simulation of the randomization of the pulse periods and durations generated by the SS clock signal 516 could be run using an arbitrary serial data transmission of sixteen (16) packets, each including thirty-two (32) bits, a reference clock signal of one (1) megahertz, and an LFSR derived from primitive polynomials. A 32,768 point Fast Fourier Transform, available in many conventional simulation programs, can be used to perform the spectrum analysis. Given these conditions, the table below shows, for LFSRs characterized by three different primitive polynomials, magnitude differences between harmonics generated by using the SS clock signal 516 and harmonics generated by using a fixed frequency clock signal.

TABLE 1

| LFSR | Amplitude Differences between Harmonics Generated by SS Clock Signal and Fixed Frequency (500 kHz) Clock Signal | | |
|---|---|---|---|
| No. of bits (no. of FFs) | 1st Harmonic | 2nd Harmonic | 3rd Harmonic |
| 5 | 9 dB | 9 dB | 9 dB |
| 7 | 15 dB | 15 dB | 15 dB |
| 11 | 21 dB | 21 dB | 21 dB |

As can be seen from Table 1, the harmonics associated with the SS clock signal 516 have significantly less energy than do the harmonics generated by a conventional, fixed frequency clock signal. Therefore, simulations can be run to determine the minimum number of FFs necessary to implement an LFSR that will vary the duration and period of the pulses of the SS clock signal 516, and thus spread the energy across the frequency spectrum, sufficiently to permit reliable radio reception.

A similar approach can be used to simulate the randomization of the slew rates using different selected outputs of the FFs 200, 202, 204, 206, 208. Generally, as more outputs are used, the randomization can be increased, by using the simulation to select appropriate set of outputs (up to four in the present example: FFs 200, 202, 204, 206). However, the use of more outputs requires more flip flops for generating the slew rate control signal 517, a larger decoder 535 to provide the 1 of N MLO drive signal 536, and more complex MLO pads.

As mentioned, the addition circuit 210 includes at least two inputs 215. The actual number and placement, i.e., feed points or taps, of the inputs 215 to the addition circuit 210 can, in an LFSR characterized by primitive polynomials, be determined using conventional computations. The results of the conventional computations for LFSRs of primitive polynomials of up to twelve (12) degrees are included in the following table. It should be noted that the polynomial degree is equivalent to the number of FFs included in the LFSR and is also indicative of a first feed point.

TABLE 2

| Degree of Polynomial | Additional Feed Points | Degree of Polynomial | Additional Feed Points |
|---|---|---|---|
| 1 |  | 7 | 1 |
| 2 | 1 | 8 | 6 5 1 |
| 3 | 1 | 9 | 4 |
| 4 | 1 | 10 | 3 |
| 5 | 2 | 11 | 2 |
| 6 | 1 | 12 | 7 4 3 |

Simulation results, preferably using feed points indicated in Table 2, are performed to yield a minimum number of FFs that can be included in the LFSR to sufficiently spread the spectrum of the SS clock signal 516. The feed points, or taps, can be determined by referencing the degree entries corresponding to the different numbers of FFs used in the simulation. The feed points indicate which Q outputs should be coupled to the inputs 215 of the addition circuit 210. When, for instance, the LFSR is to include five FFs, as shown in FIG. 13, the FFs will be labeled from left to right beginning with one. Specifically, FF 200 is the first FF, FF 202 is the second FF, FF 204 is the third FF, FF 206 is the fourth FF, and FF 208 is the fifth FF. For a fifth degree primitive polynomial, Table 2 can be referenced to determine that taps, or feed points, are at five (the degree of the polynomial) and two. In other words, the inputs 215 of the addition circuit 210 are coupled to the Q output of the fifth FF 208 and the Q output of the second FF 202. FIG. 14 is a timing diagram which illustrates the SS clock signal 516, in accordance with the preferred embodiment of the present invention. The diagram illustrates random periods and random durations of pulses 620 (alternatively described as random pulse periods and random pulse durations) and of the SS clock signal 516, in which two random periods 605, 606 and two random durations 610, 611 are identified. As illustrated by the two random periods 605, 606, the random pulse periods are the time intervals between the falling edge of one pulse and the falling edge of the next pulse. As illustrated by the two random durations 610, 611, the random pulse durations are the time intervals of the high states of the pulses. It will be appreciated that the random pulse periods could be alternatively be defined as the time intervals of the rising edges of the pulses and that the random pulse durations could be alternatively be defined as the time intervals of the low states of the pulses. A serial data signal clocked by the SS clock signal 516 is illustrated in FIG. 15, in which bit periods $C_n$ through $C_0$ have random time intervals. It will be appreciated, however, that data could alternatively be transferred at rising edges of the clock signal or any other times keyed to pulses of the SS clock signal 516 or a clock signal derived therefrom. It will be appreciated that, because the pulse periods and durations of the SS clock signal 516 are random, the pulse periods and durations of clocks derived from the SS clock signal 516 and data signals derived from the SS clock signal 516 or from clock signals derived from the SS clock signal 516 will have random pulse periods and durations.

It will be appreciated that the number of FFs and the taps characterized by different degree primitive polynomials will vary. It will also be appreciated that the feed points indicated by Table 2 can be varied, although performance may be degraded. Furthermore, the signal generator 515 can alternatively be implemented using an LFSR that is characterized by different types of polynomials, rather than by primitive polynomials. Also, the slew rate controller can alternatively be implemented having more or fewer flip-flops, depending on the quantity of slew rates to be provided, each having an input from a unique output of one of the FFs in the LFSR. The preceding example of the LFSR characterized by a primitive polynomial and the slew rate controller comprising FFs coupled thereto is used only to facilitate explanation of the signal generator 515 and its operation.

Alternative implementations of the signal generator 515 are possible, and may be desirable in certain situations. For example, the signal generator 515, multiplexer 520, and decoder 535 can alternatively be implemented using a program stored in the ROM 414 that controls and provides data to the CPU 525. In this case, the values of the pulse characteristics (the duration, period and slew rate) are generated, for example, by reading them from a table stored in the ROM 414, or alternatively by using a random number generator function provided within the CPU 525. It will be appreciated that when a stored program technique is used to generate the SS clock 516 and the slew rate control signal 517, the pulse period and pulse duration characteristics of the SS clock 516 and the slew rate can easily be generated as essentially uncorrelated random characteristics by generating three independent random signals on which the SS clock 516 and the slew rate control signal 517 are based. Alternatively, any two of these, or all three can be easily generated as correlated signals. Independent random signals can be achieved with hardware approaches such as using three noise sources, but these typically add significant circuitry.

Correlation of two or three of the characteristics, pulse period, pulse duration, and pulse slew rate, is useful in three alternative embodiments of the present invention involving correlation of the characteristics. In two of these alternative embodiments, the MLO drive signal 536 is generated so that the slew rate is correlated to either the random period or the random duration (depending on which of the two alternative embodiments is involved) of the pulses of the SS clock signal 516. In these two instances, the slew rates are designed such that larger slew rates (shorter rise and fall times) are correlated, respectively, to smaller pulse periods or smaller pulse durations, or to both. While this has the effect of reducing the randomization of the resulting external signals 551, 556, 420 (and therefore not diminishing the spectral peaks as much as when the characteristics are uncorrelated), it has the benefit of preventing a combination of the smallest slew rate (longest rise and fall times) with, respectively, the largest periods or durations, and thereby provides a lower average period of the external signals 551, 556, 420 than otherwise provided. A wider range of slew rates may therefore be accommodated without the rise and fall times of the minimum duration pulse approaching its duration. The correlation of higher slew rates with smaller pulse periods avoids excessively slow processing when the radio receiver 404 is activated, while still providing a significant reduction of the RFI generated by the microprocessor 416.

In the third alternative embodiment, the period and duration of the pulses are generated so that smaller durations are correlated with smaller periods. This is beneficial to save storage and execution time by storing or generating only the period as a pseudorandom variable and deriving the duration as a fixed portion thereof. It will be appreciated that combinations of these correlations can also be used.

Figure 16:
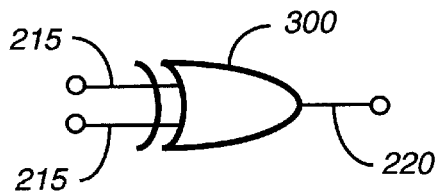
FIGS. 16–18 are an electrical block diagrams that illustrate addition circuits that are used in the signal generator, in accordance with the preferred embodiment of the present invention.
Figure 17:
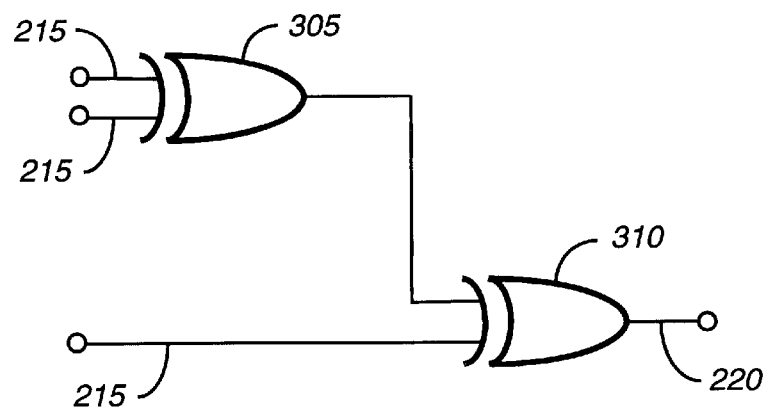
Figure 18:
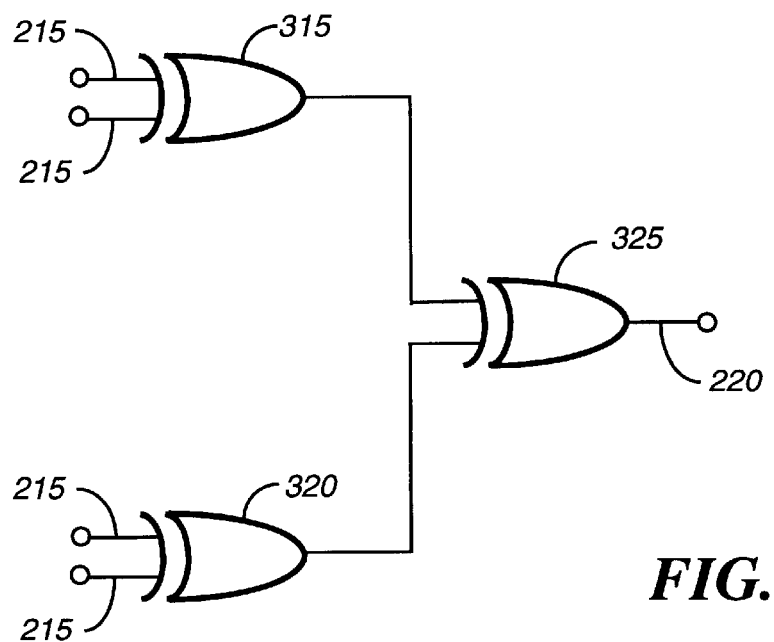

Referring next to FIGS. 16–18, electrical block diagrams of different addition circuits 210 are shown. When the signal generator 515 comprises an LFSR requiring two feed points, the addition circuit 210 can be implemented using a single exclusive OR gate 300 (FIG. 16) having inputs 215 coupled to the feed points and an output 220 coupled to the D input of FF 200 (FIG. 13).

When three feed points are required, the addition circuit 210 can be implemented using two exclusive OR gates 305, 310 (FIG. 17). Two feed points are coupled to inputs 215 of exclusive OR gate 305. The output of exclusive OR gate 305 is coupled to a first input of exclusive OR gate 310, and a third feed point is coupled to a second input 215 of exclusive OR gate 310. The output 220 of exclusive OR gate 310 is coupled to the D input of FF 200.

When four feed points are required, the addition circuit 210 can be implemented using three exclusive OR gates 315, 320, 325 (FIG. 18). Two feed points are coupled to inputs 215 of exclusive OR gate 315, and two other feed points are coupled to inputs 215 of exclusive OR gate 320. Outputs of exclusive OR gates 315, 320 are coupled to inputs of exclusive OR gate 325, and the output 220 of exclusive OR gate 325 is coupled to the D input of FF 200.

As mentioned, the addition circuit 210 preferably performs conventional modulo 2 addition. Therefore, one of ordinary skill in the art will understand that circuit designs other than those illustrated in FIGS. 14–16 can be used to implement the addition circuit 210 according to the present invention.

Figure 19:
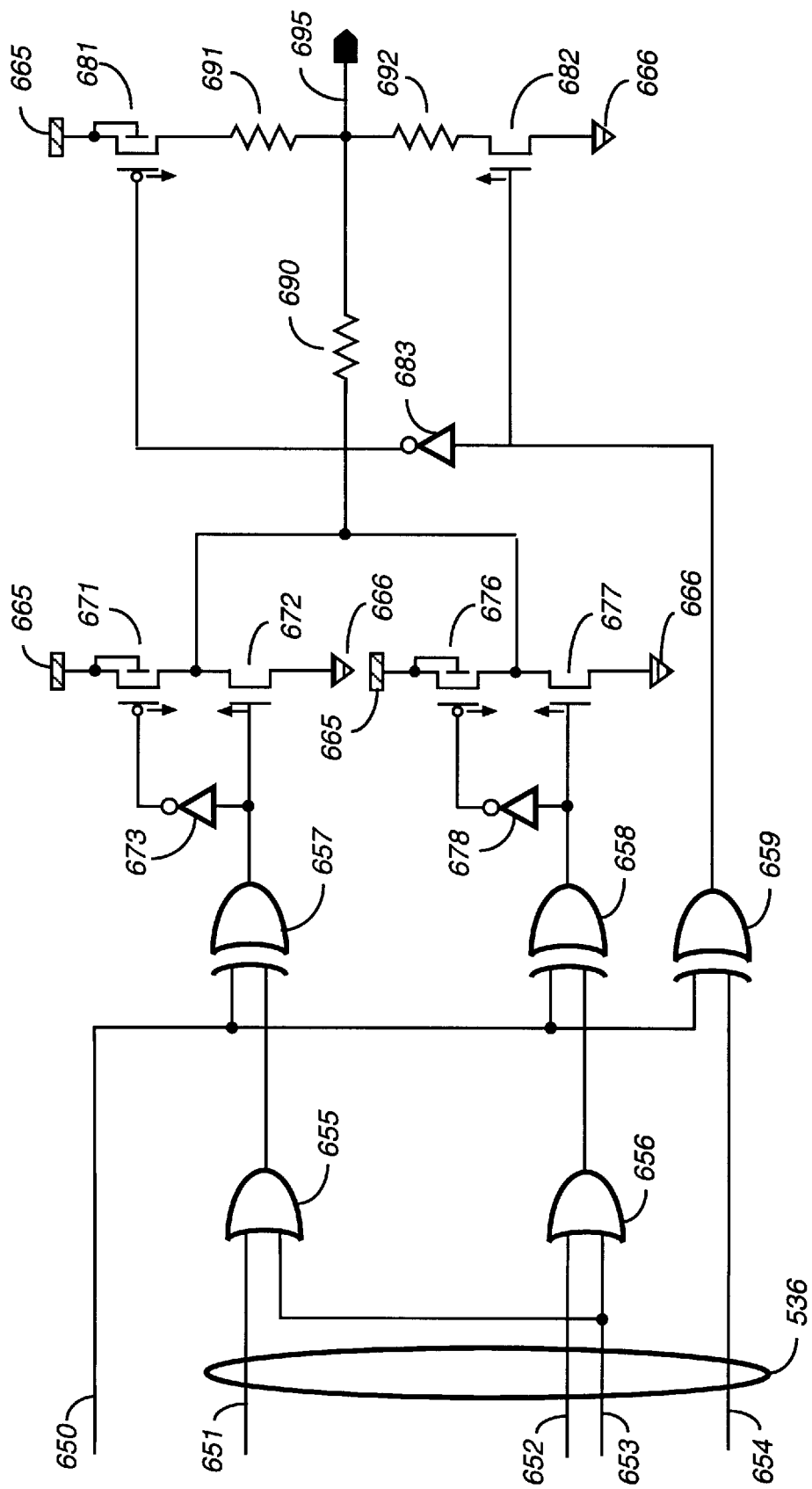
FIG. 19 is an electrical schematic diagram of a multilevel output pad used in the selective call radio, in accordance with a preferred embodiment of the present invention.

Referring to FIG. 19, an electrical schematic of a multi-level output (MLO) pad 600 is shown, in accordance with a preferred embodiment of the present invention. The MLO pad 600 is replicated to provide an MLO pad to drive each external output line of the external signals 551, 556, 420 The MLO pad 600 comprises two, two input OR gates 655, 656, three exclusive OR gates 657, 658, 659, three P channel field effect transistors (P-FETs) 671, 676, 681, three N channel field effect transistors (N-FETs) 672, 677, 682, three inverters 673, 678, 683, and three resistors 690, 691, 692; and has a serial data signal input 650 and the MLO drive signal 536 as inputs and an external output 695. The MLO drive signal 536 is a one of N line selection signal which in this case is a one of four line selection signal having four selection lines 651, 652, 653, 654. The selection line 651 is coupled to an input of the OR gate 655. The selection line 653 is coupled to a second input of the OR gate 655 and an input of the OR gate 656. The selection line 652 is coupled to a second input of the OR gate 656. The selection line 654 is coupled to an input of the exclusive OR gate 659. The output of the OR gate 655 is coupled to an input of the exclusive OR gate 657. The output of the OR gate 656 is coupled to an input of the exclusive OR gate 658. The serial data signal input is coupled to the second inputs of exclusive OR gates 657, 658, 659. The outputs of the exclusive OR gates 657, 658, 659 are coupled, respectively, to inverters 673, 678, 683 and the gate inputs of N-FETs 672, 677, 682. The outputs of the inverters 673, 678, 683 are coupled, respectively, to the gate inputs of P-FETs 671, 676, 681. One end of the channels of the N-FETs 672, 677, 682 are coupled to a circuit ground. One end of the channels of the P-FETs 671, 676, 681 are coupled to a direct current (DC) reference voltage. The other ends of the channels of the P-FETs 671, 676 and the N-FETs 672, 677 are coupled through resistor 690 to the external output 695. The other end of P-FET 681 is coupled through resistor 691 to the external output 695. The other end of N-FET 682 is coupled through resistor 692 to the external output 695.

In accordance with the preferred embodiment of the present invention, P-FET 671 has a channel width of 44 microns and a channel length of 1 micron (otherwise designated herein as a channel size of 44/1), P-FET 676 has channel size of 84/1, P-PET 681 has channel size 400/1, N-FET 672 has channel size 12/1, N-FET 677 has channel size 24/1, and N-FET 682 has channel size 200/1. Resistor 690 is 150 ohms and resistors 691, 692 are 25 ohms.

The selection line 651 selects a smallest amount of drive, the selection line 652 selects a next larger amount of drive, the selection line 653 selects yet a next larger amount of drive, and the selection line 654 selects the largest amount of drive. The serial data signal input 650 is amplified by one or more of the P-FETs 671, 676, 681 and N-FETs, 672, 677, 682, as selected by the MLO drive signal 536 and a binary state (1 or 0 as indicated by a respective high or low voltage) of the serial data signal input 650. The slew rate of the rise and fall times of the serial data signal input is determined by the selection line 651, 652, 653, 654 selected in the MLO drive signal 536. For example, when the line selected is line 653 and the serial data signal has a high voltage, the voltage on the gates of P-FETs 671, 676 are high while the voltage on the gates of P-FET 681 and N-FETs 672, 677, 682, are low, resulting in a moderately high drive amount and therefore a relatively fast slew rate. The exact slew rate is determined not only by the drive amount selected by the MLO drive signal 536, but also by the load on the external output 695. The exact slew rate is not so important as the fact that there are a number of slew rates randomly selected and that all selected slew rates are within the specified range of slew rates (rise and fall times) of the electronic component to which the external output 695 is coupled.

It will be appreciated that the SS clock signal 516 can be used to clock communications between any device components, and that the MLO drive signal 536 can be used wherever signal drivers are used that have multilevel output drive capability. Use of the SS clock signal 516 and the MLO drive signal 536 are particularly advantageous in devices that receive radio signals because the likelihood of desensing of the receiver can be conveniently minimized, thereby enhancing reliability.

It will be further appreciated that the switching of the CPU clock signal 521 and MLO drive signal 536 from randomized signals to non-random signals when the radio receiver 404 is deactivated provides an important advantage in the preferred embodiment of the present invention, which is described as follows. The SS clock signal 516 has varying pulse durations and periods, which include a minimum random period 606 (FIG. 14) and minimum random duration 611 (FIG. 14). Therefore, the average period of the SS clock signal 516 is larger than the minimum random period 606, and the average period of clock and data signals derived from the SS clock signal 516 is larger than the minimum period of the clock and data signals. When the radio receiver is deactivated, though, the clock data signals throughout the microprocessor 416 are run at a fixed period which is equal to the respective minimum periods of the clock and data signals. Also, the slew rates of the signals driven by the MLIO ports 555, 565 are run at the maximum slew rate used during the random driving of the external signals 551, 556, 420. This provides maximum data processing speed while the radio receiver 404 is deactivated, and a slower average data processing speed while the radio receiver is activated. This is advantageous with respect to other techniques for eliminating desense of a radio receiver 404 such as turning off data processing entirely during radio receiving.

The benefits of RFI reduction described above with respect to the preferred embodiment of the present invention are provided in an electronic device that is more generically described as follows.

An electronic device (for example, a selective call receiver or handheld personal assistant including a microprocessor 416; or a microprocessor, microcontroller, or digital signal processor integrated circuit) having reduced radio frequency interference (RFI) emissions includes a signal generator (such as signal generator 515) that is coupled to a reference clock signal and generates a random signal (such as 220, FIG. 13, which can alternatively be pseudorandom) derived from the reference clock signal, and further includes a first digital circuit (such as MLIO 565, CPU 525) that is coupled to the signal generator. The random signal provides a governing of pulse characteristics (e.g., period, duration, or slew rate) of pulses generated by the first digital circuit.

It will be appreciated that pulse characteristics other than period, duration, and slew rate could be governed while providing the benefits of the present invention. For example, governing the duration of the pulse and a duration of the time between pulses, as well as the slew rate, can provide the same effects as governing the period, duration, and slew rate of the pulses. Or, in another example, the slew rate could be alternatively defined to include dependent governing of the rise and fall times of each pulse of the clock and data signals driven by the MLIO ports 560, 565 (i.e., the slew rate used for the rising edge a pulse is used for the next falling edge), or the slew rate of a falling edge is used for the next rising edge.

It will be further appreciated that during the design of the electronic device in accordance with the preferred embodiment of the present invention, each pulse characteristic to be randomly varied is calculated to be within the ranges for the pulse characteristic that are specified for all electronic circuits to which the pulses are coupled. For example, the shortest period is determined so that it is not shorter than the shortest period specified for any electronic circuit to which a pulse having such shortest period is coupled.

Continuing the more generic description of the preferred embodiment of the present invention, the electronic device includes a radio receiver (such as radio receiver 404) that receives the RFI that is generated by the first digital circuit, wherein the RFI is minimized by the governing of the pulse characteristics. In other embodiments, no radio receiver is included in the electronic device. In accordance with the preferred embodiment of the present invention, the signal generator preferably generates a spread spectrum clock signal based on the random signal. The electronic device further includes a clock multiplexer coupled to the reference clock signal, the spread spectrum clock signal and the first digital circuit, wherein the first digital circuit is clocked by one of the reference clock signal and spread spectrum clock as selected by the clock multiplexer. When the radio receiver is in a deactivated state, the clock multiplexer selects the reference clock signal, and when the radio receiver is in an activated state, the clock multiplexer selects the spread spectrum clock signal. The signal generator is preferably implemented using a linear feedback shift register. Pulses of a digital signal (e.g., one of the external bus lines of the external bus 420) generated by the first digital circuit have a random slew rate that is determined (e.g., when the radio receiver 404 is activated) by the random signal. The signal generator can alternatively be embodied using other techniques such as stored program control of a central processing unit that includes a table of pseudorandom numbers or a random number function.

A slew rate control signal is generated by the signal generator, based on the random signal. The slew rate control signal has one of N discrete values during each clock period of a clock (e.g., the SS clock signal 516 or the CPU clock signal 521). The first digital circuit further comprises a multilevel output (MLO) pad coupled to the digital signal. The MLO pad drives the pulses (of the digital signal) with one of N predetermined slew rates as determined by the slew rate control signal during each clock period.

The first digital circuit is clocked by the spread spectrum clock signal pulses generated by the first digital circuit that have a set of characteristics determined by the random signal. The characteristics include one or more of period, duration, and slew rate.

Continuing the more generic description, the set of characteristics includes slew rate and period in an alternative embodiment of the present invention. The value of one of the slew rate and the period is determined during each clock period of a clock based on the random signal. The value of the other of the slew rate and the period is determined such that smaller slew rates are correlated with larger corresponding periods.

In another alternative embodiment of the present invention, the set of characteristics includes slew rate and duration. The value of one of the slew rate and the duration is determined during each clock period of a clock based on the random signal. The value of the other of the slew rate and the duration is determined such that smaller slew rates are correlated with larger corresponding durations.

In yet another alternative embodiment of the present invention, the set of characteristics includes period and duration. The value of one of the period and the duration is determined during each clock period of a clock based on the random signal. The value of the other of the period and duration is determined such that larger periods are correlated with larger durations. In yet another alternative embodiment of the present invention, the set of characteristics includes at least one characteristic the value of which has one of a finite set of values determined by the random signal during each clock period of a clock, and wherein all ratios of pairs of the finite set of values are relatively prime.

Continuing the more generic description, the electronic device further includes a second digital circuit clocked by the reference clock signal in the preferred embodiment of the present invention, wherein the second digital circuit is coupled to the first digital circuit and responsive to the first digital circuit, and wherein while (e.g., when the radio receiver 404 is activated) pulse characteristics of the second digital circuit are essentially based on the reference clock signal, pulse characteristics of at least some signals generated by the first digital circuit are based on the random signal. A specific example of this embodiment is one in which the first digital circuit is the CPU 525, and in which the second digital circuit is timer in the timers 510, having a real time base.

In the preferred embodiment of the present invention, at least one series of random values of a pulse characteristic of the first digital circuit (e.g., pulse period) is generated by a linear feedback shift register.

Figure 20:
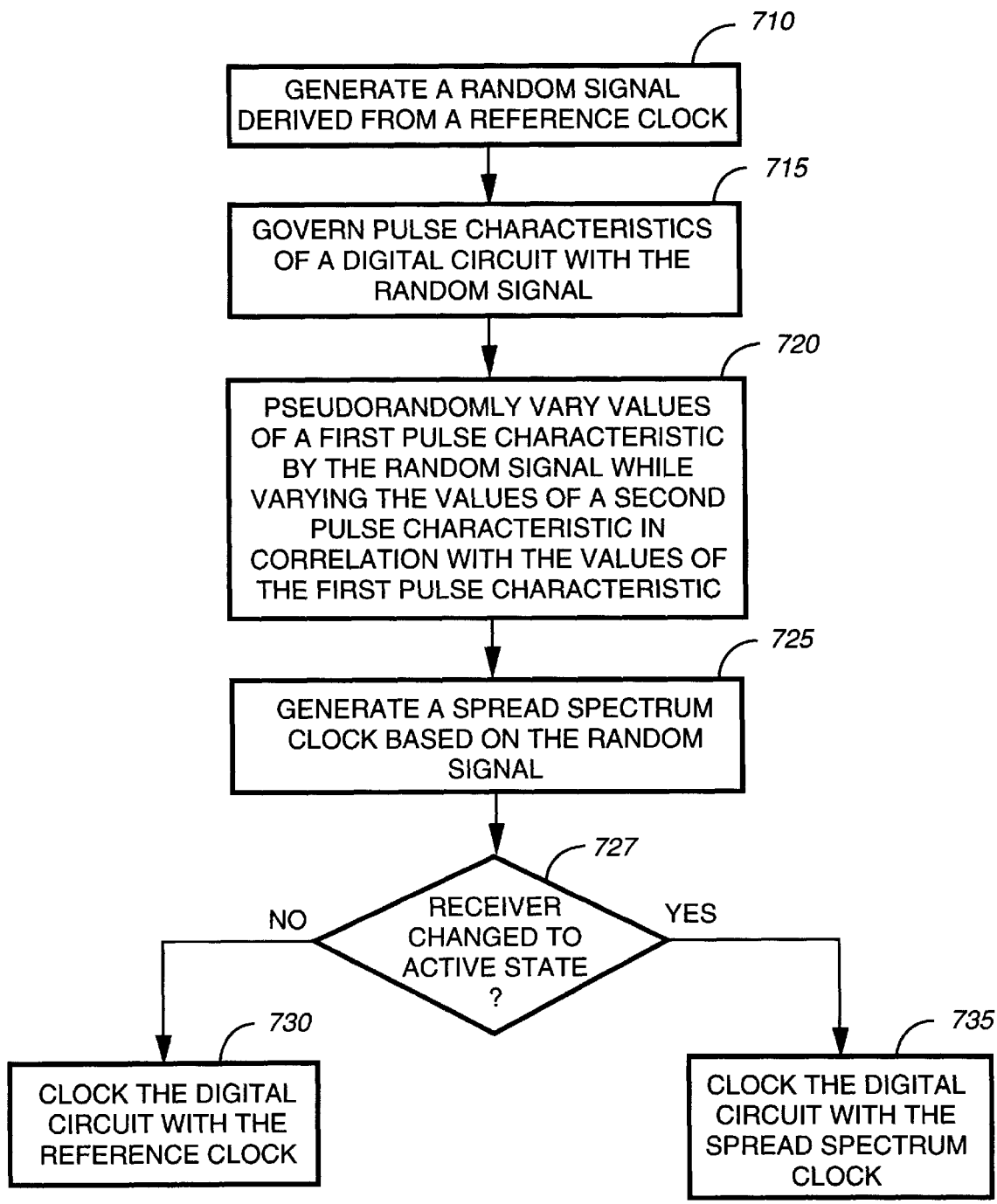
FIG. 20 is a flow chart illustrating a method for reducing radio frequency interference generated by an electronic device, in accordance with the preferred embodiment of the present invention.

Referring to FIG. 20, a flow chart illustrating a method for reducing radio frequency interference generated by an electronic device is shown, in accordance with the preferred embodiment of the present invention. At step 710 the signal generator 515 generates at least one random signal at adder output 220 that is derived from the reference clock signal 506. At step 715, the pulse characteristics of a digital circuit (the microprocessor 416) are governing by using the at least one random signal. The pulse characteristics include at least one of the pulse characteristics period, duration, and slew rate. At step 720, values of a first pulse characteristic are randomly varied by the at least one random signal at clock periods of a clock, while the values of a second pulse characteristic are varied in correlation with the values of the first pulse characteristic. For example, the slew rate is varied at clock periods of the CPU clock signal 521 when it is based on the SS clock signal 516, and the pulse period is varied to be larger when the slew rate is smaller. At step 725, the spread spectrum clock signal 516 is generated, based on the random signal 220. At step 727, a determination is made whether to change the state of the radio receiver 404 from active to inactive, or vice versa. (The radio receiver 404 is coupled to the digital circuit by radio frequency emissions from the digital circuit.) At step 730, the digital circuit is clocked with the spread spectrum clock signal 516 when the radio receiver 404 is activated. At step 735, the digital circuit is clocked with the reference clock signal 506 when the radio receiver 404 is deactivated. At step 715, pulses generated by the digital circuit have at least one characteristic (e.g., period, duration, or slew rate), the value of which has one of a finite set of values determined by the random signal 220 during each clock period of a clock, wherein all ratios of pairs of the finite set of values are relatively prime. For example, the slew rate of the external SCI output signal 551 is randomly varied to have one of the values 1/19, 1/41, 1/87, 1/151 nsec$^{-1}$ during non-random clock periods of the internal bit rate clock 532 (FIG. 5) generated by the SCI 530.

It will be appreciated that because the SS clock signal 516 and MLO drive signal 536 according to the present invention are random, the energy of the generated harmonics is more evenly distributed across the frequency spectrum, which brings down the magnitudes of the peak harmonics. As a result, use of the random signal to derive the SS clock signal 516 and MLO drive signal 536, rather than a conventional clock signal, governs pulse characteristics that are likely to cause interference with reception and processing of a radio signal. Therefore, receivers operating within close proximity to the electronic device according to the present invention function more reliably than with prior art electronic devices.

It will be appreciated by now that there has been provided a technique to provide clock and drive signals that have pulse characteristics that are randomized when a radio receiver is operated and not randomized when the radio receiver is not operating. The technique minimizes interference problems that typically result in receiver desensitization in a radio communication device having the radio receiver. It will be further appreciated that the randomization of the pulse characteristics of period, duration, and the slew rate, or any combination of them, will provide the benefits described herein when used in an electronic device not physically connected to a radio receiver, but which may be at times be located near enough to a radio receiver to cause undesirable interference. For example, the technique can be employed in a handheld personal assistant device that could be operated by the user near a broadcast receiver or pager, to avoid interference with those devices.

What is claimed is:

1. An electronic device having reduced radio frequency interference (RFI) emissions, comprising:

a signal generator coupled to a reference clock signal, that generates a random signal derived from the reference clock signal;

a first digital circuit coupled to the signal generator; and a radio receiver that receives the RFI that is emitted by the first digital circuit, wherein the signal generator generates a spread spectrum clock signal based on the random signal, and wherein the electronic device further comprises a clock multiplexer coupled to the reference clock signal, the spread spectrum clock signal and the first digital circuit, and wherein the first digital circuit is clocked by one of the reference clock signal and spread spectrum clock signal as selected by the clock multiplexer, and wherein when the radio receiver is in a deactivated state, the clock multiplexer selects the reference clock signal, and wherein when the radio receiver is in an activated state, the clock multiplexer selects the spread spectrum clock signal.

2. An electronic device having reduced radio frequency interference (RFI) emissions, comprising:

a signal generator coupled to a reference clock signal, that generates a random signal derived from the reference clock signal; and a first digital circuit coupled to the signal generator;

wherein pulses of a digital signal generated by the first digital circuit have a random slew rate that is determined by the random signal.

3. The electronic device of claim 2, wherein a slew rate control signal is generated by the signal generator based on the random signal, and wherein the slew rate control signal has one of N discrete values during each clock period of a clock, and wherein the first digital circuit further comprises a multilevel output (MLO) pad coupled to the digital signal, and wherein the MLO pad drives the pulses with one of N predetermined slew rates as determined by the slew rate control signal during each clock period.

4. An electronic device having reduced radio frequency interference (RFI) emissions, comprising:

a signal generator coupled to a reference clock signal, that generates a random signal derived from the reference clock signal; and a first digital circuit coupled to the signal generator;

wherein pulses generated by the first digital circuit have a set of characteristics comprising slew rate and period, and wherein a value of one of the slew rate and the period is determined during each clock period of a clock based on the random signal, and wherein the value of the other of the slew rate and the period is determined such that smaller slew rates are correlated with larger corresponding periods.

5. An electronic device having reduced radio frequency interference (RFI) emissions, comprising:

a signal generator coupled to a reference clock signal, that generates a random signal derived from the reference clock signal; and a first digital circuit coupled to the signal generator;

wherein pulses generated by the first digital circuit have a set of characteristics comprising slew rate and duration, and wherein a value of one of the slew rate and the duration is determined during each clock period of a clock based on the random signal, and wherein the value of the other of the slew rate and the duration is determined such that smaller slew rates are correlated with larger corresponding durations.

6. An electronic device having reduced radio frequency interference (RFI) emissions, comprising:

a signal generator coupled to a reference clock signal, that generates a random signal derived from the reference clock signal; and a first digital circuit coupled to the signal generator;

wherein pulses generated by the first digital circuit have a set of characteristics comprising at least one characteristic, a value of which has one of a finite set of values determined by the random signal during each clock period of a clock, and wherein all ratios of pairs of the finite set of values are relatively prime.

7. A method used in an electronic device, the method capable of reducing radio frequency interference generated by the electronic device, comprising the steps of:

generating a random signal derived from a reference clock signal;

governing pulse characteristics of a digital circuit with the random signal, the pulse characteristics including at least one of the pulse characteristics of period, duration, and slew rate;

generating a spread spectrum clock signal based on the random signal; and clocking the digital circuit with the spread spectrum clock signal when a radio receiver that is coupled to the digital circuit by radio frequency interference from the digital circuit is activated, and clocking the digital circuit with the reference clock signal when the radio receiver is deactivated.

8. A method used in an electronic device, the method capable of reducing radio frequency interference generated by the electronic device, comprising the steps of:

generating a random signal derived from a reference clock signal; and governing pulse characteristics of a digital circuit with the random signal, the pulse characteristics including at least one of the pulse characteristics of period, duration, and slew rate;

wherein in said step of governing pulse characteristics, pulses generated by the digital circuit have at least one characteristic, a value of which has one of a finite set of values determined by the random signal during each clock period of a clock, and wherein all ratios of pairs of the finite set of values are relatively prime.

9. A radio, comprising:

a signal generator that comprises a linear feedback shift register coupled to a reference clock signal, that generates a random signal derived from the reference clock signal;

a processor, comprising a central processing unit coupled to the signal generator and clocked by a selected clock that is one of a spread spectrum clock signal and the reference clock signal, that has random durations and random periods based on the random signal, a serial communication interface, coupled to the central processing unit and the signal generator, that is responsive to the central processing unit for generating a first digital signal that is synchronous with the reference clock signal, and a multilevel output (MLO) pad coupled to the central processing unit and the signal generator, wherein the MLO pad drives a second digital signal generated by the central processing unit, wherein the second digital signal has a second set of pulse characteristics; and a radio receiver that is operated in one of an activated and deactivated state, wherein when the radio receiver is operated in the deactivated state, the second set of pulse characteristics are essentially non-random, and wherein the second digital signal generates radio frequency interference (RFI) at a first level, and wherein when the radio receiver is operated in the activated state, the second set of pulse characteristics include pulse durations and periods that are determined by the random durations and random periods of the spread spectrum clock signal and further include a random slew rate based on the random signal, and wherein the second digital signal generates the RFI at a second level less than the first level.

* * * * *